United States Patent
Deneuvillers

(10) Patent No.: US 8,207,254 B2
(45) Date of Patent: Jun. 26, 2012

(54) USE OF A BIOPOLYMER-BASED BINDER FOR ROADS, ROAD-RELATED AND CIVIL ENGINEERING APPLICATIONS

(75) Inventor: Christine Deneuvillers, Maurepas (FR)

(73) Assignee: Colas, Boulogne-Billancourt (FR)

( * ) Notice: Subject to any disclaimer, the term of this patent is extended or adjusted under 35 U.S.C. 154(b) by 305 days.

(21) Appl. No.: 12/488,199

(22) Filed: Jun. 19, 2009

(65) Prior Publication Data

US 2009/0318602 A1    Dec. 24, 2009

(30) Foreign Application Priority Data

Jun. 20, 2008  (FR) ..................... 08 54109

(51) Int. Cl.
*C08K 3/26* (2006.01)
(52) U.S. Cl. ......... 524/425; 524/600; 524/599; 524/601
(58) Field of Classification Search .................. 524/425
See application file for complete search history.

(56) References Cited

U.S. PATENT DOCUMENTS

| 2004/0260057 A1* | 12/2004 | Michel | 530/203 |
| 2008/0125532 A1* | 5/2008 | Nelson | 524/404 |

* cited by examiner

*Primary Examiner* — Doris Lee
(74) *Attorney, Agent, or Firm* — Young & Thompson

(57) ABSTRACT

A method of making coatings, marking products and/or sealing products from a starting material including aggregate, includes the step of adding to a starting material a binder including at least one resin based on polymerized hydroxy-acid derivatives as a non bituminous binder, as a non bituminous binder, the resin(s) being selected from: a) organic resins derived from an oil or a fat having a natural origin including monoglycerides and/or diglycerides, esterified with a poly (hydroxy acid), b) organic resins corresponding to lactic polyacid and polyol esters and/or mono- or polyhydroxylated polyacid esters, c) organic resins based on lactic polyacid or lactic polyacid derivatives such as corresponding esters thereof.

17 Claims, No Drawings

USE OF A BIOPOLYMER-BASED BINDER FOR ROADS, ROAD-RELATED AND CIVIL ENGINEERING APPLICATIONS

FIELD OF THE INVENTION

The present invention relates to the a method for making building coating or layers, marking products and/or sealing products from a starting material comprising aggregates, comprising the step of adding to the starting material a binder comprising as a non bituminous binder, a biopolymer-based resin. The present invention also relates to materials and products incorporating such binder.

BACKGROUND OF THE INVENTION

Binders used in road works and associated applications comprise bitumen or acrylic-type, vinylic latexes, derived from crude oil and petrochemistry. These binders are thus obtained from fossil originating resources.

Bitumen is used in various applications because of its cementing value. Indeed, it adheres to most traditional materials such as stone, concrete, wood, metals and glass. Furthermore, it is an outstanding thermal and dielectric insulating material.

Nowadays, a lot of pavements, if not all, are coated with bituminous mixes which have demonstrated their ability on the one hand to positively answer to application constraints and, on the other hand, to endure traffic high strains and changeable climatic conditions. Such mixes or coatings are composed of aggregates bound together with bitumen or with bitumen that has been modified by adding additives, especially elastomers and/or thermoplastic polymers. Bitumen-bound aggregates are also used for building and public works in order to make amongst others waterproofing layers, sidewalk coatings, ripraps, coatings for engineering structures. In addition, bitumen is used in so-called industrial applications like waterproofing or sound and heat insulation.

Bitumen is a material derived from crude oil processing. As such, it belongs to raw materials that are said to be non renewable as crude oil is a fossil material.

The gradual exhaustion of the crude oil resources leads to the need for developing novel binders that could replace, in various applications, the traditionally used bituminous binders.

The American U.S. Pat. No. 5,021,476 describes a binder for making an elastic road pavement comprising a mineral or vegetable process oil, a resin of vegetable origin selected from a tall oil resin, a wood resin, a turpentine resin or a combination of these resins, an elastomer and a thermoplastic polymer. The previously mentioned elastomers and thermoplastic polymers are derived from a petrochemical raw material. Such binders are thus substantially not derived from renewable raw materials.

There are also binders of substantially vegetable origin used in road applications. The European patent EP 1466878 discloses binders having a natural origin prepared from a vegetable resin such as rosin or derivatives thereof and from a vegetable oil. However, these binders suffer from gaining their performance only after a curing time of at least several hours, that is to say after the drying agents have reacted with oxygen in air.

Therefore, there is a need for making non bituminous binders especially based on a renewable raw material, that could replace in various applications binders composed of non renewable components such as traditionally used bituminous binders and/or petrochemical, synthetic or semi-natural resins.

To help preserve the environment, those binders should preferably be biofragmentable, biodegradable and have a low ecotoxicity. These products should moreover be preferably made of natural raw materials with no synthetic homolog at a reasonable price.

Lastly, there is also a need for preparing natural raw material-containing resins with thermoplastic properties especially for road applications. Indeed, thermoplastic resins acquire their mechanical properties upon cooling and thus do not suffer from having a long curing time.

SUMMARY OF THE INVENTION

As used herein, "a raw material" and a "compound of natural origin" are intended to mean any product derived from the renewable, earth and sea biomass, or from living organisms (animals, microorganisms), or obtained through the action of living microorganisms (for example enzymes or bacteria) on these compounds and natural raw materials according to biofermentation or biosynthesis methods.

As used herein, a "thermoplastic" material is intended to mean a plastic material which fuses when exposed to heat or, which at least sufficiently softens to be formed indefinitely, without suffering from any change in its properties. More particularly, as used herein, a "thermoplastic property or behavior" in the context of the present invention, is intended to mean a resin which viscosity decreases as temperature increases (which makes it possible to easily handle the same at a relatively high temperature) and which retrieves its mechanical properties by the use temperatures.

The applicant discovered that resins of exclusively plant origin, having attractive thermoplastic properties could be used as a binder in materials for making building or coating layers, marking products and sealing products.

The present invention therefore relates to a method for making coatings, marking products and/or sealing products from a starting material comprising aggregates, comprising the step of adding to the starting material a binder comprising at least one resin based on polymerized hydroxyacid derivatives as a non bituminous binder. The resin(s) is or are selected from:

a) organic resins derived from an oil or a fat having a natural origin comprising monoglycerides and/or diglycerides, esterified with a poly(hydroxy acid) having the following formula:

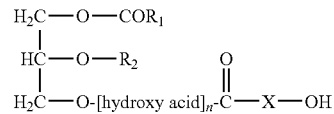

wherein,
R$_1$ is a saturated or unsaturated, aliphatic hydrocarbon chain comprising from 6 to 32 carbon atoms, optionally substituted with alkyl or hydroxyl groups,
R$_2$ is a hydrogen atom, a —COR$_4$ group, where R$_4$ has the same definition as R$_1$ or a poly(hydroxy acid) esterified group,
the poly(hydroxy acid) group corresponding to [hydroxy acid]$_n$—CO—X—OH is a linear or a branched chain, obtained by condensating hydroxy acid monomers that are the same or different, depending on the nature of the hydroxy acid, X=—CH$_2$, —CHR, where R is an alkyl group having from 1 to 5 carbon atom(s) and comprising from 0 to 5 hydroxyl function(s), n is the number of hydroxy acid units that are the same or different and ranges from 3 to 2000, and/or b) organic resins corresponding to lactic polyacid and polyol esters such as glycerol, 1,2- and 1,3-propane diol, and/or lactic polyacid and mono- or polyhydroxylated polyacid esters such as malic acid, citric acid, tartaric acid or esters thereof, preferably glycerol or citric acid esters, and/or c) organic resins based on lactic polyacid or lactic polyacid derivatives such as corresponding esters thereof.

The starting material can be aggregates, textiles, pigments in function of the desired products, i.e. coatings, marking products or sealing products.

The present invention also relates to a material for making building layers and/or coatings material building layers and/or coatings such as coated material or superficial plaster comprising a mixture of:

a) an aggregate; with
b) a binder such as previously defined.

The present invention further relates to a building layer or coating constituted of said material. Said building layer or coating represents a road work or civil engineering layer or coating.

The present invention further relates to a road marking product comprising by weight based on the total weight of the road marking product:

from 10 to 50% of a binder such as defined hereabove,
from 1 to 40% of pigments, and
from 20 to 60% of fillers.

The present invention further relates to a sealing product such as a membrane, a geomembrane and/or an insulation foil comprising a binder such as defined hereabove. More particularly, the sealing product comprises a binding medium-impregnated textile comprising:

the binder such as previously defined, and
fillers such as limestone type fillers.

DETAILED DESCRIPTION OF THE INVENTION

The present invention consists in using materials having a natural origin as substitutes for bitumen and any petrochemically-derived binder for all road applications or civil engineering applications: hot mixes, bitumen emulsions, superficial plaster, tack coats, sealing products, marking products such as permanent or temporary paints, thick surface treatments for road marking.

These products may be used for making materials to be used in building and public works, and especially materials to be used for making road work and/or civil engineering layers and/or coatings, especially for building and repairing roads, freeways, runways, industrial and sport grounds or walkways, road and network planning, railway networks; materials for implementing road equipments such as signaling; materials for building industrial premises, especially for providing tightness and insulation to industrial premises, protecting and splinting the civil engineering works and industrial premises, noiceproof walls and all traffic security devices, as well as for making any material associated with these domains.

The binder of the invention comprises resins which have preferably a substantially natural origin, preferably a vegetable origin. According to the present invention, as used herein, "a resin which has a substantially natural origin" means a resin which comprises, based on the resin total weight, at least 95%, preferably at least 99% and even more preferably 100% by weight of compounds of natural origin.

The binders of the invention may comprise one or more resin(s). By suitably coupling various resins and taking advantage of the nature of the components used, binders may be obtained which characteristics meet an extended performance range.

Although not recommended because of the already mentioned ecologic considerations, other resins may be nonetheless used for formulating the binder of the present invention, which are not 100% of natural origin. The binder may thus comprise in addition an organic resin d) obtained by reacting glycerol, vegetable or animal oil-derived triglycerides and at least one diacid such as maleic acid, phthalic acid, iso- and terephthalic acid, succinic acid, fumaric acid, adipic acid, suberic acid, sebacic acid, azelaic acid or a corresponding ester or anhydride thereof.

Most preferably, the binder of the invention is devoid of any non renewable product, such as bitumen or synthetic elastomers, such as for example polybutadiene, styrene-butadiene rubber (SBR), styrene-butadiene-styrene (SBS), ethylene-vinyl acetate (EVA), etc., and of any synthetic thermoplastic polymer such as, for example, polyolefins (polyethylene, polypropylene), and polyamides.

The resin a) of the present invention is derived from an oil or a fat that is said to be of natural origin as it is obtained from monoglycerides or diglycerides. These monoglycerides and diglycerides are themselves obtained from triglycerides which are the main component of vegetable oils and animal fats. Indeed, vegetable oils are oils with a triglyceride high content or are mainly composed of triglycerides of glycerol and fatty acid ester, the fatty acids of which may be saturated or unsaturated, linear or branched, with from 6 to 32 carbon atoms and optionally from 0 to 10 unsaturation(s) and from 0 to 5 (—OH) hydroxyl function(s).

Vegetable oils to be suitably used in the invention include oleic and erucic rapeseed oils, linseed oil, sunflower seed oil, castor oil, soybean oil, palm oil, palm kernel oil, coconut oil, corn oil, cottonseed oil, groundnut oil, rice bran oil, olive oil, China wood oil and *Jatropha curcas* oil. *Jatropha curcas* oil extracted from the ripe *Jatropha curcas* seeds is an oil which is in liquid state at room temperature, of the unsaturated type, with a majority of oleic fatty acids (43-53%), linoleic fatty acids (20-32%) and palmitic fatty acids (13-15%). Other sources of natural triglycerides may also be used, such as fish oils, micro- and macro-alga oils, tallow oil and tall oil.

Preferably, oils having fatty acids comprising from 12 to 20 carbon atoms and more preferably C18-rich fatty acids, such as oleic, linoleic or linolenic acid are chosen.

Hydroxy acids are organic acids characterized by at least one hydroxyl function (—OH) and at least one carboxylic function (—COOH). Natural hydroxy acids of the invention may comprise from 1 to 5 acid function(s) and from 1 to 6 hydroxyl function(s) in the alpha, beta, gamma and delta position of the acid function. α-hydroxyacids carry the hydroxyl function on the carbon adjacent to the carboxylic acid function (i.e. in position 1 of the acid function), while β-hydroxyacids carry the hydroxyl function on the second carbon adjacent to the carboxylic acid function (i.e. in position 2 of the acid function).

Natural hydroxy acids to be suitably used in the present invention include lactic acid (either in the D, L and racemic form), citric acid, malic acid, tartaric acid, glycolic acid, salicylic acid and β-hydroxybutyric acid. Lactic acid, citric acid or malic acid will be preferably used. One can also use corresponding lactones or dilactones (e.g., lactide). Lactic acid may be derived from plants or milk. Graft polyhydroxyacids thus belong to the group consisting of polylactate, polymalate, polyglycolate, polycitrate resulting from the condensation of the corresponding natural hydroxy acids.

The average molecular weight of an esterified poly(hydroxy acid) chain corresponding to the [hydroxy acid]$_n$—CO—X—OH group preferably ranges from 350 to 100 000 g·mol$^{-1}$, preferably from 350 to 20 000 g·mol$^{-1}$.

The resin a) of the invention is therefore substantially of natural origin as it is obtained from natural oil or fat derivatives and from natural hydroxy acids.

The resin a) is obtained by reacting at least one hydroxy acid or one hydroxy acid ester in excess, or one already formed poly(hydroxy acid), with a mono- and/or a diglyceride. This step is conducted in the presence of a catalyst selected in the group consisting of tin, iron, zinc and aluminium organic salts, mineral or organic acids, basic catalysts, preferably the catalyst is a tin ethylhexanoate (SnOct$_2$). The reaction is conducted at a temperature ranging from 100 to 220° C., preferably from 140 to 200° C. and is from 5 to 12 hours long, preferably around 9 hours long.

In another embodiment, corresponding esters of these hydroxylated acids may be used (for example, ethyl lactate) in order to produce through transesterification the family a) products, subject of the present invention.

When the reaction is conducted with an already formed poly(hydroxy acid), it means that the condensation of the hydroxy acid has been made aside, and that the polyester formed has been thereafter made reacted with the previously prepared mixture of monoglycerides and diglycerides.

The resin a) is preferably obtained by reacting from 1 to 30% by weight, preferably from 1 to 20% by weight of monoglyceride and/or diglyceride with from 70 to 99% by weight, preferably with from 80 to 98% by weight as related to the resin total weight, of a hydroxy acid or an already formed poly(hydroxy acid), The [hydroxy acid]/[number of acid+hydroxyl functions] molar ratio ranges from 3 to 1000, preferably from 5 to 500, and more preferably from 5 to 120. Said "[number of acid+hydroxyl functions]" expression corresponds, as expressed by mole, to the total number of reactive functions that are present:

- in the monoglycerides, if so, it remains two hydroxyl functions that may react per monoglyceride; or in the diglycerides, and if so, it remains one hydroxyl function that may react per diglyceride,
- in the fatty acid ester chains which may comprise one or more hydroxyl group(s).

By suitably selecting this molar ratio, the average length of the polyacid chains which will be graft onto each reactive function of the monoglyceride or diglyceride can be determined.

The resins a) of the invention either correspond to:
monoglycerides that have been monoesterified with a polymerized hydroxy acid,
monoglycerides that have been diesterified with a polymerized hydroxy acid, or
diglycerides that have been esterified with a polymerized hydroxy acid.

The monoglyceride and/or diglyceride has been previously obtained either by glycerolizing the triglycerides, or by esterifying the glycerol with the fatty acids.

When the monoglyceride and/or the diglyceride is or are obtained by glycerolizing the triglycerides, the glycerol:oil molar ratio ranges from 0.5 to 5. For obtaining a diglyceride-rich mixture, a glycerol:oil molar ratio ranging from 0.9 to 1.1 is chosen. For obtaining a monoglyceride-rich mixture, a glycerol:oil molar ratio ranging from 1.9 to 2.1 is chosen.

The glycerol used is preferably a vegetable- or animal-originating one.

The resin b) of the invention is obtained by reacting lactic acid with polyols such as glycerol, 1,2- and 1,3-propane diol, and/or mono- or polyhydroxylated polyacids such as malic acid, citric acid, tartaric acid or esters thereof, preferably glycerol or citric acid. The resins b) of the invention therefore correspond to lactic polyacid and polyol esters and/or to mono- or polyhydroxylated polyacid esters.

Mono- or polyhydroxylated polyacids correspond to compounds comprising at least two carboxylic acid functions and one hydroxyl function in case of a monohydroxylated polyacid and at least two hydroxyl functions in case of a polyhydroxylated polyacid. Mono- or polyhydroxylated polyacid esters may serve as a raw material alternative in order to produce through transesterification the family b) products, subject of the present invention.

The resin b) of the invention is thus of substantially natural origin as it is obtained from lactic acid and polyols and/or from mono- or polyhydroxylated polyacids of natural origin.

The parameters of the resin b) preparation method, that is to say the temperature and the reaction time, as well as the selected catalysts, are the same as those of the step of polymerizing and grafting the resin a) polyhydroxyacid chain.

This step is generally carried out by reacting from 5 to 20% by weight, preferably from about 10 to 15% by weight of polyol and/or mono- or polyhydroxylated polyacid, with from 80 to 95% by weight, preferably from 85 to 90% by weight based on the resin total weight, of lactic acid.

The [hydroxy acid]/[number of acid+hydroxyl functions] molar ratio ranges from 3 to 15. The "[number of acid+hydroxyl functions]" expression, in case of resin b), corresponds, as expressed by mole, to the total number of reactive functions that are present in:

the polyol, i.e. 3 for example for glycerol,
the mono- or polyhydroxylated polyacid, i.e. 4 for example for citric acid.

By suitably selecting this molar ratio, the average length of the polyacid chains which will be graft onto each reactive function of the polyol or mono- or polyhydroxylated polyacid can be determined.

The resin c) corresponds to the lactic polyacid or derivatives thereof (PLA or polylactid). These resins are well known and have a 9051-89-2 CAS registration number assigned. These resins possess preferably the following characteristics:

a density of about 1.24,
a melting temperature range from 150 to 180° C.,
a glass transition temperature range from 55 to 65° C.

The resin d) corresponds to the resins produced by reacting glycerol with triglycerides (vegetable or animal oils) and diacids, preferably acid anhydrides. Vegetable oils may be selected from the oils described for the resins a). Corresponding diacids or acid anhydrides may be selected from maleic, phthalic, iso- and terephthalic, succinic, fumaric, adipic, suberic, sebacic, and azelaic acids. Esters of these diacids may also be used to produce through transesterification the family d) products, subject of the present invention.

Preferably, the resin d) is obtained by reacting mono- or diglycerides with diacids or phthalic anhydrides. This step is conducted at a temperature of about 150° C. for 5.5 hours. The resin d) thus corresponds to the mono- and diglyceride esterification product with diacids. The resin d) preferably results from an [acid functions]/[alcohol functions] molar ratio of about 1. Mono and/or diglycerides are obtained as described in the part of the document concerning the resin a).

When the binders of the invention comprise many different resins, they are obtained by simply mixing the resins together under stirring, at a temperature and for a time period sufficient for producing a homogeneous binder. The temperature is typically of about 120° C.

In a preferred embodiment of the invention, the binder comprises a resin a) and/or a resin b). Preferably, when the binder comprises a combination of resins a) and b), the weight ratio of the resin a) to the resin b) ranges from 10:90 to 90:10.

Finally, when the binder comprises the resin c), the resin c) represents by weight as related to the binder's resin total weight, from 10 to 90% by weight, preferably from 10 to 40% by weight and even more preferably is about 20% by weight.

According to another embodiment of the invention, the binder comprises a resin c) and/or a resin d). Preferably, when the binder comprises a combination of resins c) and d), the weight ratio of the resin c) to the resin d) ranges from 10:90 to 90:10, preferably from 20:80 to 80:20.

The binder of the invention may also comprise one or more coloring agent(s) such as mineral pigments and organic dyes.

The binder of the invention may be employed for making materials to be used in building and public works, especially materials to be used for making road work and/or civil engineering layers and/or coatings. Thus, the binder of the invention may be used to bound aggregates together and optionally to make them adhere to the support onto which they are spread, or to help them adhere.

The term "aggregate" means a granular mineral material used in the building field and notably as described in the XP P 18-545 standard. Aggregates, as defined in the XP P 98-135 standard, may also be used in combination with the binder of the invention. The aggregates comprises the fines, fillers, sand, chippings and coarse aggregate. For characterizing the road coatings, the description of their granular formula will be preferably used, that is to say the weight distribution of the aggregates comprised in the coating composition, depending on its grain-size range.

The binder may be combined with the aggregates before application to make hot or cold mixes (coating method) or may be spread on the roadway before or after spreading the aggregates in order to form said layers or coatings.

The present invention therefore relates to a material for making building layers and/or coatings comprising a mixture of an aggregate and a binder of the invention. Preferably, said material comprises by weight based on the total weight of the material:

a) 85% to 97% of aggregate,
b) 3 to 15% of binder.

The aggregates comprise fine aggregates having a grain size distribution ranging between 0 and 80 μm (fine and/or fillers) and coarser aggregates selected from the group constituted of sand, chipping and/or coarse aggregate. The grain size distribution of the coarser aggregates can be up to 80 mm.

The material can be a coated material or a superficial plaster. This material is used to make building layers and coatings.

These layers or coatings are formed in situ i.e. the layer or the coating is directly formed on the support intended to be coated. For example, in the case of road work layer and/or coating, the support will be the roadway. The layers or coating thus formed can be continuous. The layers or coatings are preferably for outdoor use.

Therefore, the invention also concerns a building layer and/or coating obtained in situ by application of a mixture of a binder of the invention and an aggregates on the roadway or by spreading said binder on the roadway before or after spreading the aggregates. These layers or coatings for building works are preferably layers or coatings for road applications or civil engineering works.

As to the bituminous mixes, the technological progress made it possible to choose granular formulas that are more efficient than others to satisfy performance requirements. As used herein, the "performances" mean the properties of the coating mixes such as characterized hereunder using the following test methods:

| Performance | Test standard | Comments |
| --- | --- | --- |
| Compactability | NF P98-252 | Coating ability to be implemented according to a specified compacity |
| Mechanical strength and water resistance | NF P98-251-1 | Durability against the traffic stress and the ravelling risks |
| Tracking resistance | NF P98-253-1 | Ability to withstand to traffic-induced deformation |
| Complex modulus | NF P98-260-2 | Ability to resist to strains. |
| Fatigue behavior | NF P98-261-1 | Ability to maintain unchanged the coating properties depending on the load repetitions |

Requirements for bitumens are specified in the NF EN 12591 standard. They are generally characterized by their penetrability, as measured according to NF EN 1426 standard and expressed in tenth of millimeters, by their softening temperature, expressed in degree Celsius and measured according to NF EN 1427 standard, or by their viscosity. Depending on the expected final use, the bitumen is selected amongst classes that are defined according to the NF EN 12591 standard.

That explains why the binder, when used in road applications, is characterized by the same parameters, measured according to the same methods, and expressed in the same units.

The binder of the invention may be used depending on the application, as such (without any solvent), fluxed (that is to say additived with a solvent) or as a water emulsion.

In case of emulsions, any traditional, cationic, anionic or non ionic emulsifying agent may be used, as well as combinations thereof.

The bitumen may be brought to emulsion so as to make it easier to employ in many various applications, such as:

superficial plaster, tack coats, cold-cast mixes, vulcanisation layers, impregnation, soil and gravel-sand mixture treatments, emulsion gravel-sand mixtures, emulsion-type coatings, and generally speaking, the methods such as described in the book "Les émulsions de bitume" edited by the French professional Union for bitumen road emulsions, syndicat français des émulsions routières de bitume (SFERB).

the protective coatings for pipelines, metallic engineering structures, concrete engineering structures, binders for making heat and sound insulating panels based on wood or polymer material particles, and generally the uses described in "The Shell Bitumen Industrial Handbook" published by Shell Bitumen in 1995, ISBN 0-9516625-1-1.

The binder of the invention may easily be converted to an emulsion by using the emulsifying agents that are traditionally employed for emulsifying bitumens. These cationic, anionic or non-ionic emulsifying agents, or combinations thereof, are well known from the man skilled in the art.

The emulsion formula is chosen depending on the expected application. This binder emulsion of the invention may then replace the bitumen emulsions in their applications.

The binder amount used for making a layer or a coating corresponds to that of the traditionally used bitumen for the same application. Thus, when the binder is used for making coated materials, said coated materials preferably comprise from 3 to 15% by weight of binder as related to the coated material total weight. The aggregates represent preferably from 85 to 97% by weight of the coated material total weight.

The present invention further relates to a road marking product comprising:
from 10 to 50%, preferably from 30 to 40% of a binder,
from 1 to 40%, preferably from 5 to 25% of pigments, and
from 20 to 60%, preferably from 35 to 45% of aggregates such as fillers.

When the binder is used as a binder for a marking product, it comes preferably as an aqueous phase or a solvent phase emulsion, preferably an aqueous phase. The binder as an emulsion comprises from 30 to 70% of solid content by weight of the binder total weight. The marking product may comprise in addition to the solvents of the organic base binder, one or more solvent(s) that may be the same or different as compared to those of the organic base binder.

The binder thus comprises the organic binder, strictly speaking, or resin, and a solvent that may be water. The marking products of the present invention therefore comprise from 5 to 20% by weight of an organic resin based on the marking product total weight.

The fillers enable to adjust some mechanical, chemical, electrical or rheological characteristics. Fillers originating from mineral sources are preferably used. The most often used fillers include sulfates, silicates, carbonates such as calcium carbonate ($CaCO_3$) and dolomite ($CaCO_3$, $MgCO_3$), oxides such as amorphous or crystallized silica ($SiO_2$). Laminates or fibers may also be suitably used.

Preferably, the marking products in the solvent phase comprise solvents derived from vegetable or animal origin renewable resources such as Vegeflux® and bioethanol.

The marking products may comprise in addition one or more additive(s) selected from coalescing agents, anti-foaming agents, thickeners, surfactants and dispersing agents.

Preferably, the marking products are permanent or temporary solvent-based or aqueous type road paints, cold or hot applicable coatings, or preformed road-marking strips. A road paint type marking product preferably comprises, in addition to said composition, glass beads and/or anti-skid materials that may be incorporated as a premix or by powdering.

The present invention also relates to sealing products like for example membranes, geomembranes or insulation foils. Indeed, bituminous membranes and geomembranes are used in the field of civil engineering as a sealing barrier. Bituminous geomembranes are composed of a textile, called a geotextile, that is impregnated with bitumen. This geotextile is a woven or a non woven material, based on polyethylene, polypropylene, polyamide or polyester, or a mixture thereof. Coletanche® product marketed by Axter is a suitable example to be mentioned.

These bituminous geomembranes guarantee the tightness of the structure into which they are incorporated. They have been adjusted so as to consider the following environmental issues:
waste containment,
liquid pollutant and lixiviate storage,
miscellaneous waste storage, and especially radioactive waste storage,
underground water protection.
They are also used for building hydraulic structures like dams, basins and canals.

Compositions of insulation foils also comprise bitumen. To be mentioned as suitable examples are the Alpal® or Hyrene® products marketed by the Axter company. These insulation foils are used:
to make flat roofs watertight (inaccessible, autoprotected or gravel-surfaced, roof gardens, pedestrian zones, private roof terraces . . . ),
to insulate underground walls,
to insulate civil engineering works,
to make roofs for buildings watertight (private or industrial housing).

Sealing products of the membrane or geomembrane type comprise a binding medium-impregnated textile comprising:
the binder such as defined hereabove,
aggregates such as fillers such as limestone type fillers.
Preferably, this binding medium comprises from 10 to 30% of fillers.

The binder of the invention may replace bitumen with no technical difficulties. The composition of the binder of the invention has been adjusted to match the characteristics of the bitumen it should replace.

Unless otherwise specified, all parts and percentages are by weight in the following examples.

EXAMPLE

1. Preparing Resins of the Invention 1.1 Resins a)
Components:
Castor, rapeseed or linseed triglyceride
Glycerol
NaOH (catalyst)
Lactic acid
$Sn_2$Octanoate (catalyst)

Production principle: In a first step, vegetable oil-derived triglycerides are reacted with glycerol in a [glycerol]/[oil] molar ratio of 2. This step is carried out in a glass reactor provided with a mechanical stirring device at 220° C. for 2 hours. The components are combined with soda as a catalyst. The entire triglyceride conversion is controlled by HPLC. At the end of the reaction, the mixture is slowly cooled down. As a result, following this step, a monoglyceride high-content mixture is obtained. Thereafter, in a second step, in a glass reactor provided with a mechanical stirring device and a Dean-Stark, the monoglyceride high-content mixture is reacted for 9 hours at 150° C. in the presence of lactic acid and $Sn_2$Octanoate as a catalyst. The [lactic acid]/[acid+hydroxyl functions] molar ratio is 12.5.

Resin a) Example:
A1: 15% of a monoglyceride high-content mixture (Linseed oil (80%) and glycerol (20%)) and 85% of lactic acid
A2: 15% of a monoglyceride high-content mixture (Rapeseed (80%) and glycerol (20%)) and 85% of lactic acid
A3: mixture of mono- and diglycerides obtained from castor oil+lactic acid, wherein mono and diglycerides are present in a monoglyceride to diglyceride weight ratio of 60:40, the lactic acid to mono- and diglyceride molar ratio is 25:1.

1.2 Resin b)

Components:
- Glycerol
- Citric acid
- Lactic acid
- $Sn_2$Octanoate (catalyst).

Production principle: glycerol or citric acid are reacted with lactic acid in a [lactic acid]/[acid+hydroxyl functions] molar ratio ranging from 5 to 18 for 9 hours at 150° C. in the presence of $Sn_2$Octanoate as a catalyst.

Resin b) Example:
B1: 10% of glycerol and 90% of lactic acid
B2: 15% of citric acid and 85% of lactic acid 1.3 Resin c)

The polylactic acid used in the tests is a product that is commercially available, especially under the trade name NatureWorks 8302D marketed by the NatureWorks LLC company.

1.4 Resin d)

Components:
- Castor, rapeseed or linseed triglyceride
- Glycerol
- NaOH (catalyst)
- Phthalic anhydrides Production principle: In a first step, triglycerides (or oil) are reacted with glycerol in a [glycerol]/[oil] molar ratio of 2. This step is carried out at 220° C. for 2 hours. Following this step, a monoglyceride high-content mixture is obtained. Thereafter, in a second step, the monoglyceride high-content mixture is reacted in the presence of phthalic anhydrides for 5.5 hours at 220° C. The [acid function acid]/[alcohol functions] molar ratio is of 1.

Resin d) Example:
D1: 40% of a mixture of mono- and diglycerides (75% linseed and 25% glycerol) and 60% of phthalic anhydrides

2. Formulation Examples for Binders of the Invention

| Binders | Dosages | Family | Pen EN1426 | BRT EN1427 |
|---|---|---|---|---|
| A1/B1 | 50%/50% | A + B | 33 1/10 mm | 37° C. |
| D/C1 | 80%/20% | D + C | 0.1 1/10 mm | 80° C. |
| A2/B2 | 50%/50% | A + B | 14 1/10 mm | 49° C. |
| A3/D | 80%/20% | A + D | — | — |

Pen EN1426 corresponds to the penetrability as measured according to the EN1426 standard. BRT EN1427 corresponds to the ball-ring temperature as measured according to the EN1427 standard. It can therefore be observed that the resulting resins indeed possess a penetrability and a ball-ring temperature which fall within the bituminous binder traditional value ranges.

3. Examples of Binders of the Invention 3.1. Coated Materials

A coated material of the very thin bituminous concrete type (BBTM) was made from aggregates "La Noubleau" marketed by the Carrières Roy company. The granular formula was as follows:

| Aggregates | % |
|---|---|
| 6/10 Noubleau | 34 |
| 2/6 Noubleau | 34 |
| 0/2 Noubleau | 30 |
| Filler Picketty | 2 |

The binder resulting from the A2-B2 50:50 mixture of the invention was incorporated into the granular formula to represent 5.6% by weight of the binder+aggregates total weight.

This coated material obtained following characteristics:
Duriez strain: 14.9 MPa
Rutting: 6.5% after 27 000 cycles The Duriez strain corresponds to the Duriez compressive strength according to the NF P98-251-1 standard. The rutting resistance is as measured according to the NF P98-253-1 standard.

The Duriez strain of this coating which comprises a binder the penetrability of which is 14 1/10 mm is similar to that obtained with a 10:20 bitumen of the same formula. Moreover, as per the rutting, the standard allows a rutting at 3000 cycles <15% for classes 2.

It could therefore be observed that the binders with the resins of the invention are, as regards the performance, surprisingly similar to the bituminous binders traditionally used.

3.2. Marking Products

An aqueous road paint was prepared with the following components.

| Family | Raw material | Weight dosage |
|---|---|---|
| Emulsion | 60% binder A3/D<br>0.3% Radiasurf 7404<br>water to 100% | 26.1% |
| Fillers | Durcal 15 | 41.5% |
| Pigments | Lithopone | 18% |
| Additives | Dispersing agent/<br>Thickener | 2.4% |
| Water | | 12% |

Radiasurf 7404 is an emulsifying agent marketed by the OLEON company. Durcal 15 are calcium carbonate fillers marketed by the OMYA company. Lithopone is a white pigment based on barite, zinc sulfide and zinc oxide.

This paint has following characteristics:
Solid content (NF EN ISO 3251 standard): 78.3%
Ash content (NF T 30-012 standard): 42.4%
Drying time at 20° C./50% hygrometry (NF L16116): 35 minutes
Persoz hardness at D+7 (NF EN ISO 1522): 37 seconds
Chromatic co-ordinates (EN 1436): Y=93; x=0.318; y=0.328
Viscosity of Brookfield R4V10 (ISO 2555): 3800 mPa·s It can be observed that a paint comprising in its formulation the binder of the invention has similar characteristics as compared to the traditionally used paints.

The invention claimed is:
1. A method for making coatings, marking products and/or sealing products from a starting material comprising aggregates,
the method comprising:
adding to the starting material a binder comprising at least one resin based on polymerized hydroxyacid derivatives as a non bituminous binder, the resin(s) being selected from:

a) organic resins derived from an oil or a fat having a natural origin comprising monoglycerides and/or diglycerides, esterified with a poly(hydroxy acid) of following formula:

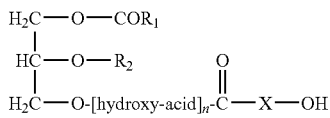

wherein,
$R_1$ is a saturated or unsaturated, aliphatic hydrocarbon chain having from 6 to 32 carbon atoms, optionally substituted with alkyl or hydroxyl groups,
$R_2$ is a hydrogen atom, a —$COR_4$ group, where $R_4$ has the same definition as $R_1$, or a poly(hydroxy acid) esterified group,
the poly(hydroxy-acid) group corresponding to [hydroxyl-acid]$_n$—CO—X—OH is a linear or a branched chain, obtained by condensating hydroxy acid monomers that are the same or different,
X is —$CH_2$, or —CHR, where R is an alkyl group having from 1 to 5 carbon atom(s) and comprising from 0 to 5 hydroxyl function(s),
n is the number of hydroxy acid units that are the same or different and ranges from 3 to 2000, and/or
b) organic resins of lactic polyacid, polyol esters, glycerol, 1,2- and 1,3-propane diol, lactic polyacid and mono- or polyhydroxylated polyacid esters, malic acid, citric acid, tartaric acid or esters thereof, glycerol or citric acid esters, and/or
c) organic resins of lactic polyacid, lactic polyacid derivatives and/or corresponding esters thereof,
wherein said aggregates comprise fine aggregates having a grain size distribution in a range between 0-80 μm and coarser aggregates selected from the group consisting of sand, chipping and coarse aggregate.

2. The method according to claim 1, wherein the binder comprises a mixture of resins a) and b).

3. The method according to claim 1, wherein the coating is a continuous layer or coating.

4. The method according to claim 1, wherein the marking product is a road marking product comprising:

from 10% to 50% of the binder,
from 1% to 40% of pigments, and
from 20% to 60% of fillers.

5. The method according to claim 1, wherein the sealing product is a membrane and/or a geomembrane.

6. The method according to claim 1, wherein the at least one diacid is maleic acid, phthalic acid, isophthalic acid and terephthalic acid, succinic acid, fumaric acid, adipic acid, suberic acid, sebacic acid, azelaic acid or a corresponding ester or anhydride.

7. The method according to claim 1, wherein the binder further comprises an organic resin d) obtained by reacting glycerol, triglycerides and at least one diacid.

8. The method according to claim 7, wherein the binder comprises a mixture of resins c) and d).

9. The method according to claim 1, wherein the sealing product comprises a binding medium-impregnated textile, the binding medium comprising a binder and filler.

10. The method according to claim 9, wherein the filler comprises limestone type fillers.

11. The method according to claim 1, wherein the binder comprises resin c) and said resin c) represents from 10% to 90% by weight based on the total weight of the binder resin.

12. The method according to claim 11, wherein resin c) represents from 10% to 40% by weight, based on the total weight of the binder resin.

13. The method according to claim 11, wherein resin c) represents about 20% by weight, based on the total weight of the binder resin.

14. The method according to claim 1, wherein the coatings comprise by weight based on the total weight of the material:
a) 85% to 97% of aggregate, and
b) 3% to 15% of binder.

15. The method according to claim 14, wherein the coating is a coated material or a superficial plaster.

16. The method according to claim 14, wherein the coating is obtained in situ by application on a roadway of a mixture of the binder and aggregates or by spreading said binder on the roadway before or after spreading the aggregates.

17. The method according to claim 16, wherein the coating is applied outdoor.

* * * * *